United States Patent
Costa de Oliveira et al.

(10) Patent No.: US 11,473,394 B2
(45) Date of Patent: Oct. 18, 2022

(54) PIPE COUPLING DEVICES FOR OIL AND GAS APPLICATIONS

(71) Applicant: Saudi Arabian Oil Company, Dhahran (SA)

(72) Inventors: Victor Carlos Costa de Oliveira, Dhahran (SA); Khaled K. Abouelnaaj, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 589 days.

(21) Appl. No.: 16/535,482

(22) Filed: Aug. 8, 2019

(65) Prior Publication Data
US 2021/0040812 A1 Feb. 11, 2021

(51) Int. Cl.
| E21B 33/12 | (2006.01) |
| F16L 17/02 | (2006.01) |
| E21B 33/124 | (2006.01) |
| F16L 17/10 | (2006.01) |

(52) U.S. Cl.
CPC ...... *E21B 33/1212* (2013.01); *E21B 33/1208* (2013.01); *F16L 17/02* (2013.01); *E21B 33/1243* (2013.01); *F16L 17/10* (2013.01)

(58) Field of Classification Search
CPC ............. E21B 33/1208; E21B 33/1212; E21B 33/1216; E21B 33/126; E21B 33/1265; E21B 33/128; F16L 17/02; F16L 21/04; F16L 39/005
See application file for complete search history.

(56) References Cited

U.S. PATENT DOCUMENTS

| 5,715,891 A | 2/1998 | Graham |
| 6,105,669 A | 8/2000 | Davis |
| 7,665,355 B2 * | 2/2010 | Zhang .................. G01L 5/0004 |
| | | 73/152.48 |

(Continued)

FOREIGN PATENT DOCUMENTS

| CN | 105443067 | 3/2016 |
| GB | 2492478 | 1/2013 |
| RU | 2691416 | 6/2019 |

OTHER PUBLICATIONS

GCC Examination Report in Gulf Cooperation Council Appln. No. GC 2020-40258, dated Sep. 7, 2021, 5 pages.

(Continued)

*Primary Examiner* — Nicholas L Foster
(74) *Attorney, Agent, or Firm* — Fish & Richardson P.C.

(57) ABSTRACT

A pipe coupling device includes a body configured to connect a first pipe segment to a second pipe segment, a sealing device carried by the body, and an activation unit. The sealing device includes a circumferential element including a first material and a peripheral element connected to an edge of the circumferential element and including a second material that is different from the first material. The activation unit is configured to adjust the sealing device to an activated state in which the sealing device extends radially from the body to form at least a portion of a seal with a pipe that surrounds the body, such that the seal fluidically isolates a first annular region between the first pipe segment and the pipe along a first side of the seal from a second annular region between the second pipe segment and the pipe along a second side of the seal.

23 Claims, 9 Drawing Sheets

(56) References Cited

U.S. PATENT DOCUMENTS

| | | | |
|---|---|---|---|
| 7,690,432 B2 | 4/2010 | Noske et al. | |
| 9,376,884 B2* | 6/2016 | Clarke | E21B 33/1216 |
| 9,587,459 B2* | 3/2017 | Broussard | E21B 43/14 |
| 9,745,818 B2* | 8/2017 | Broussard | E21B 43/04 |
| 9,963,960 B2 | 5/2018 | Tolman et al. | |
| 10,544,648 B2* | 1/2020 | Costa De Oliveira | E21B 47/06 |
| 10,557,330 B2* | 2/2020 | Costa De Oliveira | E21B 47/00 |
| 10,689,913 B2* | 6/2020 | Costa de Oliveira | E21B 17/1021 |
| 10,689,914 B2* | 6/2020 | Costa de Oliveira | E21B 44/02 |
| 2004/0168800 A1 | 9/2004 | Sask | |
| 2007/0044977 A1* | 3/2007 | Hendrickson | E21B 33/128 166/387 |
| 2008/0236271 A1* | 10/2008 | Zhang | E21B 33/1216 73/152.48 |
| 2011/0037229 A1* | 2/2011 | Clarke | E21B 33/1216 277/322 |
| 2011/0048744 A1 | 3/2011 | Conner et al. | |
| 2011/0114333 A1 | 5/2011 | Fenton | |
| 2013/0161000 A1* | 6/2013 | Broussard | E21B 33/1243 166/278 |
| 2015/0176364 A1* | 6/2015 | Broussard | E21B 34/06 166/51 |
| 2018/0298717 A1 | 10/2018 | Costa de Oliveira et al. | |
| 2018/0306005 A1* | 10/2018 | Costa De Oliveira | E21B 37/04 |
| 2019/0292896 A1* | 9/2019 | Costa de Oliveira | E21B 17/1021 |
| 2019/0292897 A1* | 9/2019 | Costa de Oliveira | E21B 17/10 |

OTHER PUBLICATIONS

PCT International Search Report and Written Opinion in International Appln. No. PCT/US2020/045643, dated Sep. 28, 2020, 16 pages.

\* cited by examiner

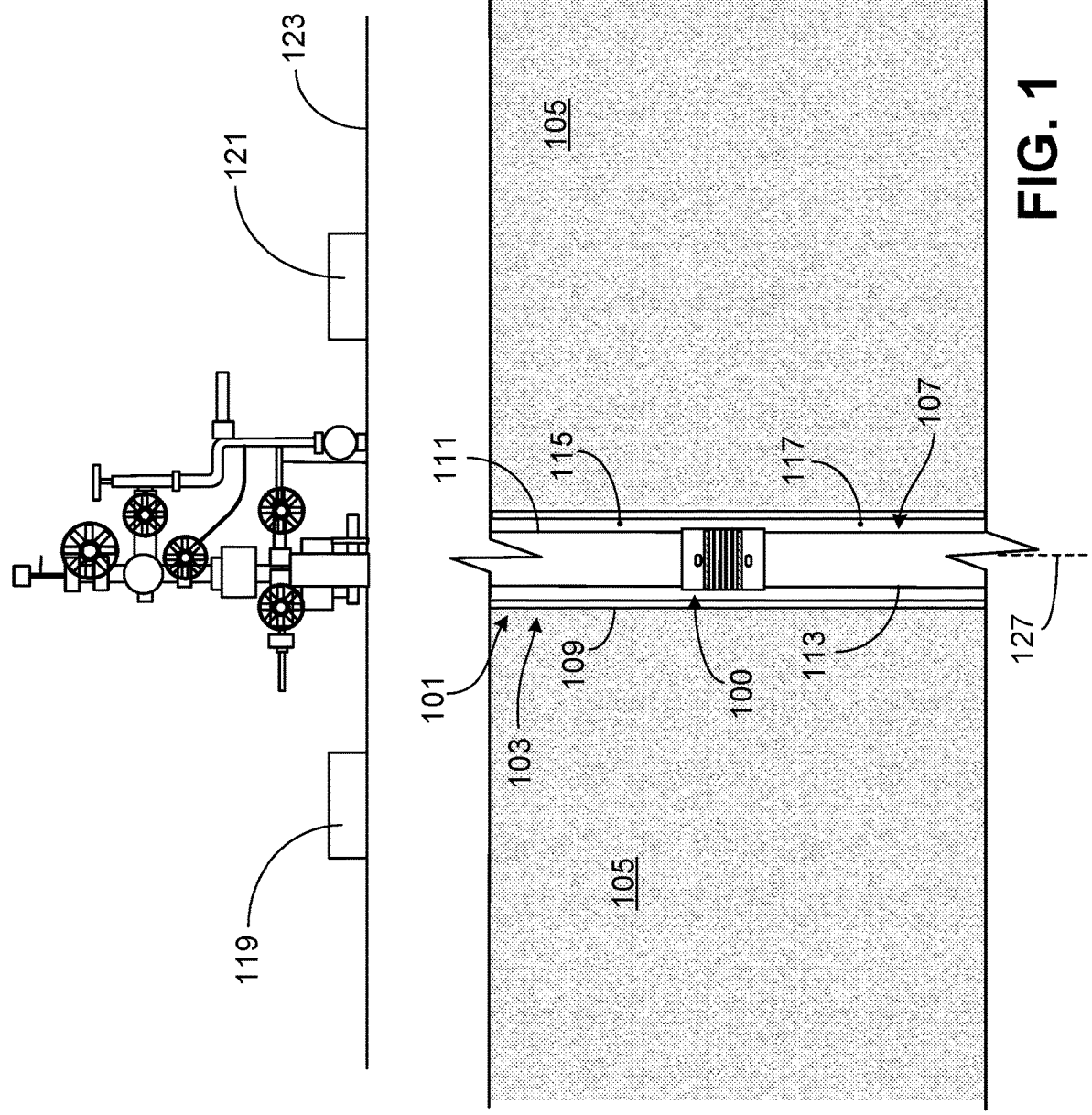

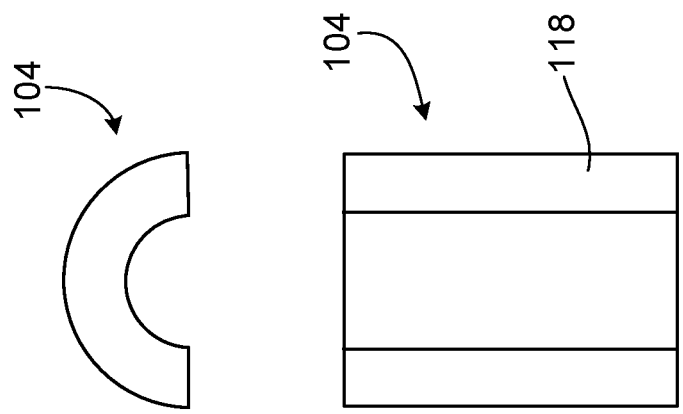
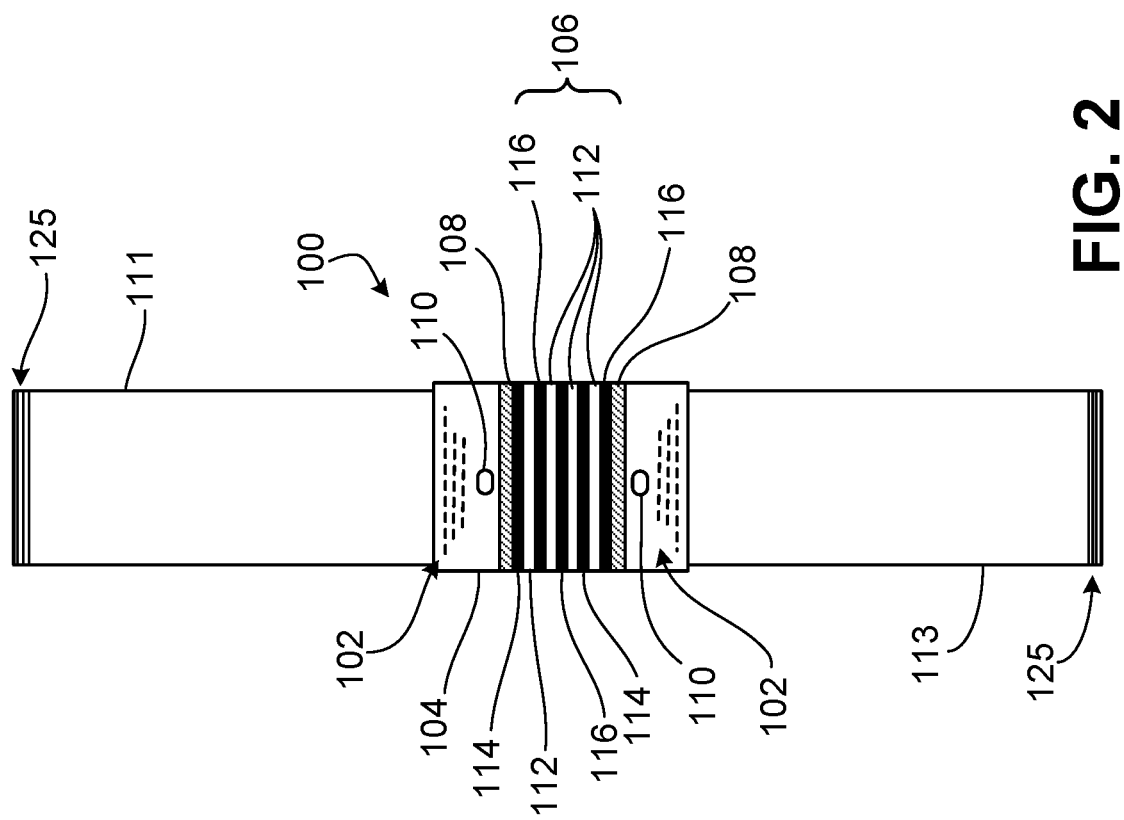
FIG. 3
FIG. 2

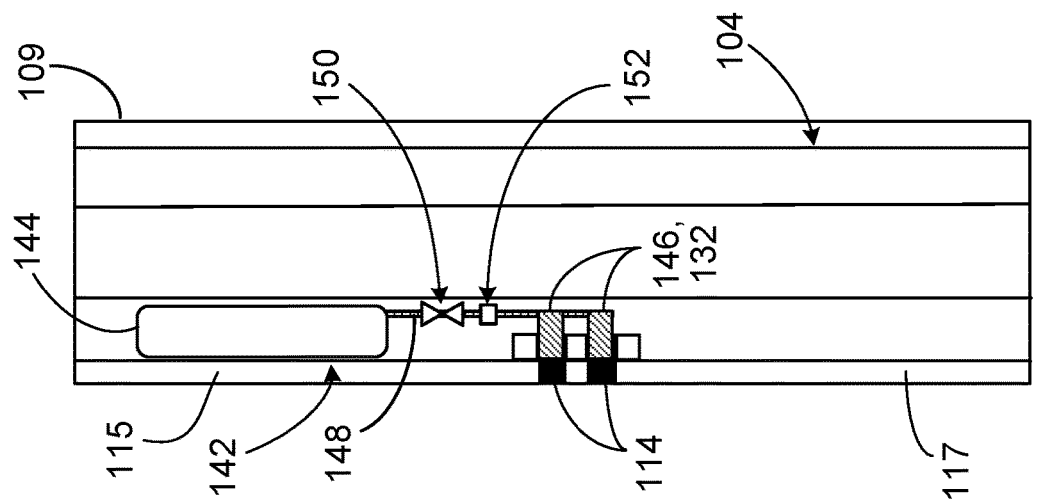
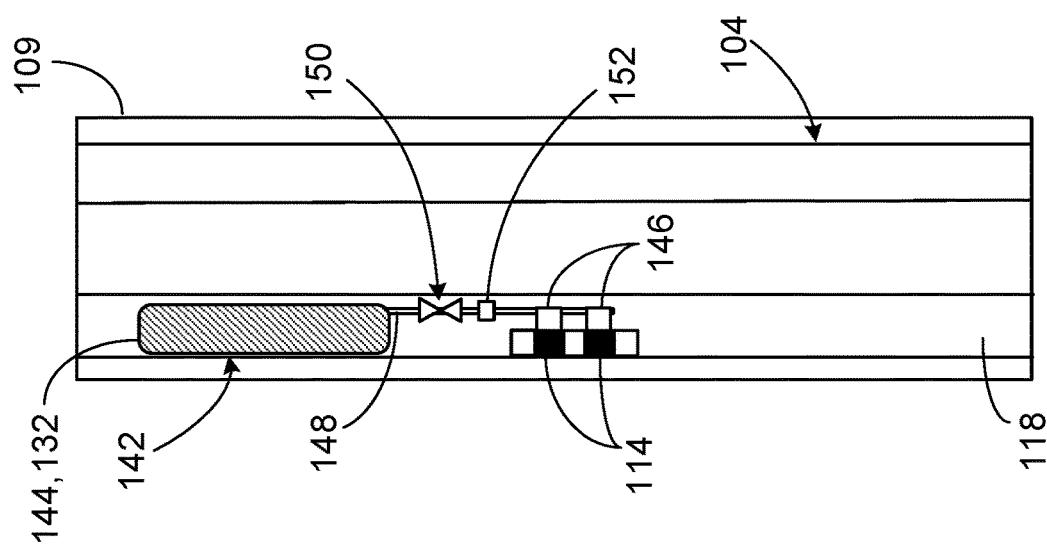

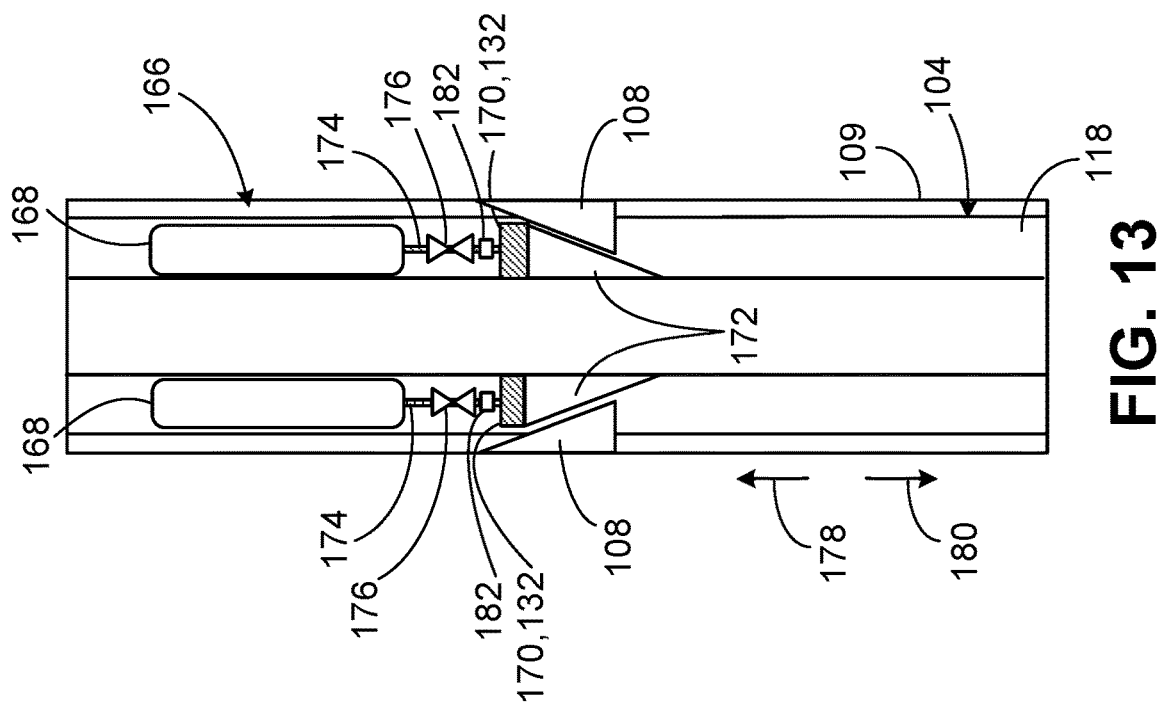
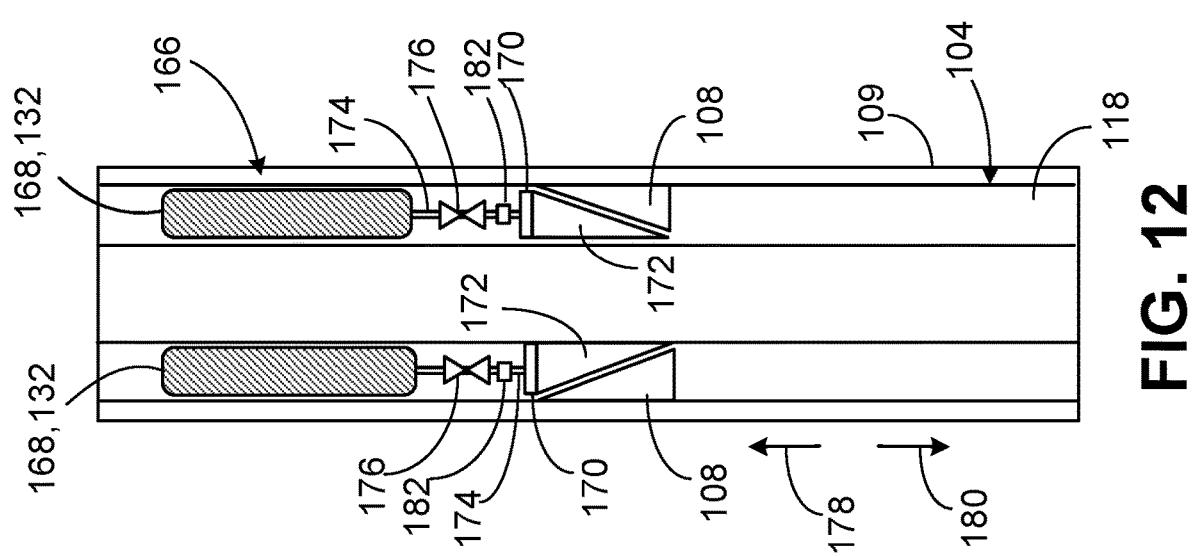

PIPE COUPLING DEVICES FOR OIL AND GAS APPLICATIONS

TECHNICAL FIELD

This disclosure relates to pipe coupling devices that provide automatic casing-to-casing sealing within a wellbore while communicating status information in real time.

BACKGROUND

Casing-to-casing fluidic isolation in wellbores is facing new demands as a result of unconventional wellbore construction methods and a growing regulatory environment. For example, new hydraulic fracturing techniques and directional drilling techniques involving longer laterals and deep-set production strings present challenges to isolation performance standards, and government regulation is increasingly involved in defining such performance standards over the life of a wellbore. One of the key objective of these efforts is to prevent gas from migrating uphole within annular regions located between adjacent pipes, as sustained casing pressure associated with gas migration can be costly to remediate and present life-of-well maintenance problems. In many examples, inflatable packers are deployed to prevent gas migration. However, the use of inflatable packers has significant limitations in that performance of such packers depends on several parameters external to the packers, such as tubing integrity, well geometry, cleaning of completion and drilling fluids, and rig capabilities.

SUMMARY

This disclosure relates to a pipe coupling device that connects consecutive pipe segments (for example, casing segments) of a pipe assembly installed within a wellbore of a rock formation. The pipe coupling device is designed to be attached to adjacent ends of two pipe segments and to seal against a wall of an outer pipe to isolate annular regions around the pipe segments that are defined above and below the coupling device. For example, the coupling device includes a triple sealing mechanism with metal sealing elements, rubber sealing elements, and hybrid metal-and-rubber sealing elements to provide such sealing. The coupling device further includes positioning elements (for example, slips) that center the coupling device along a central axis of the outer pipe, pressure sensors that measure pressures within the isolated annular regions, multiple hydraulic power units (HPUs) that are operable to activate and deactivate the sealing elements and the positioning elements, a control unit that transmits data between the surface of the rock formation and the various components of the coupling device, and a battery for powering the control unit and the HPUs. The control unit collects data from the pressure sensors, the HPUs, and the positioning elements to identify equipment problems related to the pipe segments and sends such diagnostic information to the surface for real-time monitoring. The control unit also receives commands remotely generated at the surface and controls operation of the various components of the coupling device based on the commands in an automated manner.

In one aspect, a pipe coupling device includes A pipe coupling device includes a body configured to connect a first pipe segment to a second pipe segment, a sealing device carried by the body, and an activation unit. The sealing device includes a circumferential element including a first material and a peripheral element connected to an edge of the circumferential element and including a second material that is different from the first material. The activation unit is configured to adjust the sealing device to an activated state in which the sealing device extends radially from the body to form at least a portion of a seal with a pipe that surrounds the body, such that the seal fluidically isolates a first annular region between the first pipe segment and the pipe along a first side of the seal from a second annular region between the second pipe segment and the pipe along a second side of the seal and such that the first and second materials of the sealing device are both in contact with the pipe along the seal.

Embodiments may provide one or more of the following features.

In some embodiments, the peripheral element includes a first flap and a second flap that are pivotable with respect to the circumferential element.

In some embodiments, the peripheral element is adjustable between an open configuration in which the first and second flaps extend away from the circumferential element and a closed configuration in which the first and second flaps lie against the circumferential element and define a gap therebetween.

In some embodiments, the circumferential element is configured to extend into the gap when the sealing device is in the activated state.

In some embodiments, the sealing device is a first sealing device, the activation unit is a first activation unit, the activated state is a first activated state, and the pipe coupling device further includes a second sealing device carried by the body and including the first material and a second activation unit configured to adjust the second sealing device to a second activated state in which the second sealing device further forms the seal with the pipe.

In some embodiments, the pipe coupling device further includes a third sealing device carried by the body and including the second material and a third activation unit configured to adjust the third sealing device to a third activated state in which the third sealing device further forms the seal with the pipe.

In some embodiments, the pipe coupling device is configured such that the first, second, and third activation units can selectively, respectively activate the first, second, and third sealing devices independently of each other.

In some embodiments, the pipe coupling device further includes one or more additional sealing devices.

In some embodiments, the activation unit is further configured to adjust the sealing device to a deactivated state in which the sealing device is disposed substantially within the body to form an opening between the coupling device and the pipe that allows fluid communication between the first and second annular regions.

In some embodiments, the activation unit includes a hydraulic system configured to adjust the sealing device to the activated state.

In some embodiments, the pipe coupling device further includes one or more positioning elements carried by the body and configured to center the pipe coupling device about a central axis of the pipe.

In some embodiments, the pipe coupling device further includes a first pressure sensor arranged along the body to measure a first pressure in the first annular region and a second pressure sensor arranged along the body to measure a second pressure in the second annular region.

In some embodiments, the pipe coupling device further includes a control unit in electrical communication with remote electronic components and with the activation unit, the one or more positioning elements, and the first and second pressure sensors.

In some embodiments, the control unit is configured to receive status information in real time from one or more of the activation unit, the one or more positioning elements, and the first and second pressure sensors.

In some embodiments, the control unit is configured to transmit the status information in real time to one or more of the remote electronic components.

In some embodiments, the control unit is configured to identify a failure associated with the sealing device based on the status information.

In some embodiments, the control unit is configured to receive a sealing command from one or more of the remote electronic components.

In some embodiments, the control unit is configured to send the sealing command to the activation unit for activation of the sealing device.

In some embodiments, the first material includes rubber.

In some embodiments, the second material includes metal.

In another aspect, a method of sealing a pipe assembly includes connecting a first pipe segment of the pipe assembly to a second pipe segment of the pipe assembly with a body of a pipe coupling device and radially extending a sealing device of the pipe coupling device from the body with an activation unit of the pipe coupling device to adjust the sealing device to an activated state. The sealing device includes a circumferential element including a first material and a peripheral element connected to an edge of the circumferential element and including a second material that is different from the first material. The method further includes forming at least a portion of a seal between a pipe of the pipe assembly that surrounds the body and the sealing device in the activated state such that the first and second materials of the sealing device are both in contact with the pipe along the seal and fluidically isolating a first annular region between the first pipe segment and the pipe along a first side of the seal from a second annular region between the second pipe segment and the pipe along a second side of the seal.

Embodiments may provide one or more of the following features.

In some embodiments, the peripheral element includes a first flap and a second flap that are pivotable with respect to the circumferential element.

In some embodiments, the method further includes adjusting the peripheral element between an open configuration in which the first and second flaps extend away from the circumferential element and a closed configuration in which the first and second flaps lie against the circumferential element and define a gap therebetween.

In some embodiments, the method further includes urging the circumferential element into the gap when the sealing device is in an activate state.

In some embodiments, the sealing device is a first sealing device, the activation unit is a first activation unit, the activated state is a first activated state, the pipe coupling device further includes a second sealing device including the first material, and the method further includes radially extending the second sealing device from the body with a second activation unit of the pipe coupling device to adjust the second sealing device to a second activated state.

In some embodiments, the pipe coupling device further includes a third sealing device including the second material, and the method further includes radially extending the third sealing device from the body with third second activation unit of the pipe coupling device to adjust the third sealing device to a third activated state.

In some embodiments, the method further includes selectively activating the first, second, and third sealing devices independently of each other with the first, second, and third activation units, respectively.

In some embodiments, the method further includes receiving status information at a control unit of the pipe coupling device from one or more of the activation unit, a first pressure sensor of the pipe coupling device arranged along the body to measure a first pressure in the first annular region, a second pressure sensor of the pipe coupling device arranged along the body to measure a second pressure in the second annular region, and one or more positioning elements of the pipe coupling device carried by the body and configured to center the pipe coupling device about a central axis of the pipe.

In some embodiments, the method further includes transmitting the status information in real time from the control unit to one or more remote electronic components.

In some embodiments, the method further includes identifying a failure associated with the sealing device based on the status information at the control unit.

The details of one or more embodiments are set forth in the accompanying drawings and description. Other features, aspects, and advantages of the embodiments will become apparent from the description, drawings, and claims.

DESCRIPTION OF DRAWINGS

FIG. 1 is a side cross-sectional view of an example wellbore at which an example coupling device is installed along an example pipe assembly.

FIG. 2 is a side view of the coupling device of FIG. 1 installed to inner pipe segments of the pipe assembly of FIG. 1.

FIG. 3 provides cross-sectional views of the coupling device of FIG. 1.

FIG. 8 is a side cross-sectional view of an HPU and cooperating rubber seals of the coupling device of FIG. 1 in a deactivated state.

FIG. 9 is a side cross-sectional view of the HPU and the cooperating rubber seals of FIG. 8 in an activated state.

FIG. 12 is a side cross-sectional view of an HPU and cooperating positioning elements of the coupling device of FIG. 1 in a deactivated state.

FIG. 13 is a side cross-sectional view of the HPU and the cooperating positioning elements of FIG. 12 in an activated state.

DETAILED DESCRIPTION

Figure 5:
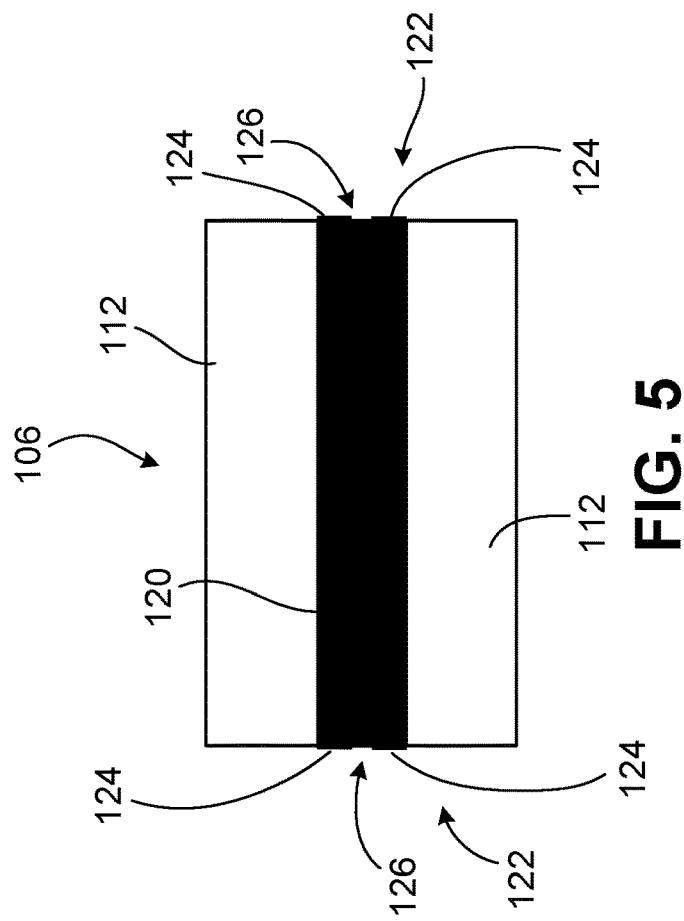
FIG. 5 is an enlarged view of the hybrid seal of FIG. 4 in a closed configuration.

FIG. 1 illustrates a portion of an example pipe assembly 101 installed within a wellbore 103 (for example, a gas wellbore or an oil wellbore) of a rock formation 105. The pipe assembly 101 provides a framework for a drill string to be deployed to the wellbore 103 for production at the wellbore 103 or for completion of the wellbore 103. The pipe assembly 101 includes an inner pipe 107 nested within an outer pipe 109, among other pipe segments that are not shown. The inner pipe 107 includes an uphole pipe segment 111 (for example, a casing joint) and a downhole pipe segment 113 (for example, a casing joint) that are connected by a coupling device 100 (for example, a tubular pipe segment).

The coupling device 100 is designed to seal against an inner surface (for example, a metal surface) of the outer pipe 109 in an automated manner to fluidically isolate an uphole annular region 115 surrounding the uphole pipe segment 111 from a downhole annular region 117 surrounding the downhole pipe segment 113. In this regard, the coupling device 100 can provide casing-to-casing sealing. Such isolation can prevent any gases within the downhole annular region 117 or any gases located further downhole of the coupling device 100 from migrating in an uphole direction into the uphole annular region 115. Prevention of such gas migration can further prevent an excessive build-up of gas pressure within the uphole annular region 115 and other detrimental effects otherwise associated with such gas migration. The coupling device 100 is also designed to communicate electronically with remote components located at a surface 123 of the wellbore 103, including a transmitter 119 and a receiver 121.

FIG. 2 illustrates an enlarged view of the inner pipe 107. The uphole pipe segment 111 and the downhole pipe segment 113 each include male threads 125 on each end for engagement with female threads 102 located near each end of the coupling device 100. The coupling device 100 includes a tubular body 104 that internally defines the female threads 102, multiple seals 106 positioned along a central region of the body 104 for isolating the annular regions 115, 117 from each other, two positioning elements 108 (for example, slips) located along opposite ends of the seals 106 for centering the coupling device 100 about a central axis 127 of the outer pipe 109, and two pressure sensors 110 respectively located adjacent the positioning elements 108 for measuring pressures in the annular regions 115, 117.

Referring to FIGS. 2 and 3, the body 104 has a substantially cylindrical outer shape and a substantially annular cross-sectional shape. Accordingly, the body 104 defines an annular interior region 118 that houses the various other components of the coupling device 100 (not shown in FIG. 3). The body 104 provides the coupling device 100 with a compact size. For example, in some embodiments, the body 104 may have an outer diameter in a range of about 12.7 centimeters (cm) to about 87 cm and a length in a range of about 2.54 cm to about 700 cm, which can vary depending on the application for which the coupling device 100 is used. The various dimensions of the body 104 may be selected depending on one or both of an axial position of the coupling device 100 within the wellbore 103 and dimensions of adjacent pipe segments of the pipe assembly 101 that will be joined to the coupling device 100. The body 104 is typically made of one or more of materials, such as any of carbon steel, a chrome material, and a high alloy.

The seals 106 include metal seals 112 that effect metal-to-metal sealing with the outer pipe 109, rubber seals 114 that effect rubber-to-metal sealing with the outer pipe 109, and hybrid seals 116 that effect both metal-to-metal and rubber-to-metal sealing with the outer pipe 109. In the example coupling device 100, the rubber seals 114 and the hybrid seals 116 are arranged in an alternating pattern with the metal seals 112. The seals 106 have a generally annular cross-sectional shape and can be activated to extend radially from the body 104. Such radial extension causes the seals 106 to seal against the inner surface of the outer pipe 109 to fluidically isolate the annular regions 115, 117 from each other. The seals 106 are formed as annular discs. In some embodiments, in a deactivated configuration, the seals 106 may have an outer diameter in a range of about 12.7 cm to about 87 cm and an inner diameter in a range of about 10 cm to about 83 cm, which can vary depending on the application for which the coupling device 100 is used. In some embodiments, the coupling device 100 typically includes 1 to 50 of the metal seals 106, which can vary depending on the application for which the coupling device 100 is used.

In some embodiments, the metal seals 112 may have an axial length in a range of about 1 cm to about 100 cm and may be formed from one or more expandable metals, such as alloy and carbon steel. In some embodiments, the rubber seals 114 may have an axial length in a range of about 1 cm to about 100 cm and may be formed from one or more rubber materials. In activated states of the seals 106, the seals 106 may extend a radial distance in a range of about 12.7 cm to about 87 cm from a circumference of the body 104 to seal against the outer pipe 109. Such dimensions and material selections may vary depending on the application for which the coupling device 100 is used.

Figure 4:
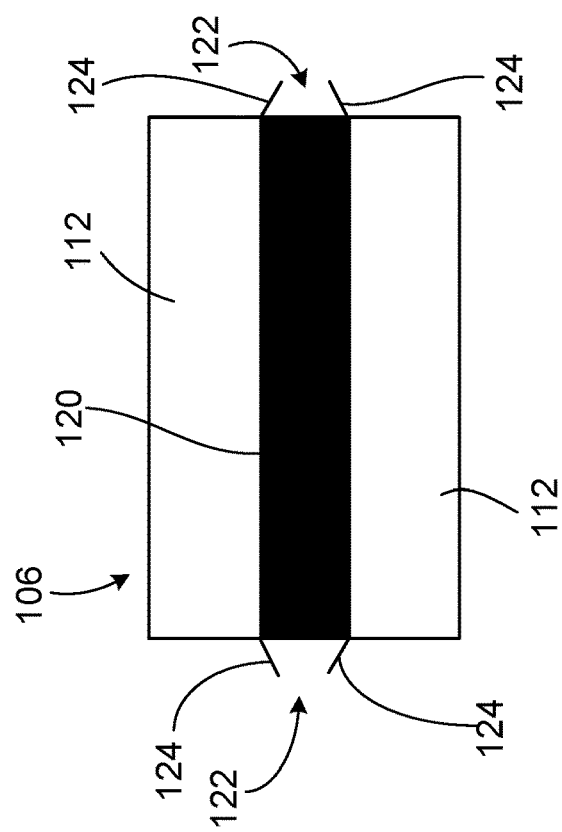
FIG. 4 is an enlarged view of a hybrid seal of the coupling device of FIG. 1 in an open configuration.

Referring to FIGS. 4 and 5, each hybrid seal 116 includes a rubber sealing element 120 (for example, a disc-shaped sealing element) that is substantially similar in construction to a rubber seal 114 and an adjustable metal sealing element 122 that is attached to the rubber sealing element 120 along exterior radial edges of the rubber sealing element 120. Similar to a rubber seal 114, the rubber sealing element 120 may have an axial length in a range of about 1 cm to about 100 cm and may be formed from one or more rubber materials which may vary depending on the application for which the coupling device 100 is used.

The metal sealing element 122 includes two cooperating flaps 124 that are attached to the rubber sealing element 120 via a hinge that is made of metal or another material. The flaps 124 extend around a circumference of the metal sealing element 122. The flaps 124 can be pivoted radially away from the rubber sealing element 120 to form an open configuration (for example, associated with a deactivated configuration of the hybrid seal 116) of the metal sealing element 122 (for example, as shown in FIG. 4) and can be pivoted radially towards the rubber sealing element 120 to collapse onto the rubber sealing element 120, thereby forming a closed configuration (for example, associated with an activated configuration of the hybrid seal 116) of the metal sealing element 122 (for example, as shown in FIG. 5). In some embodiments, each flap 124 may have an axial length in a range of about 1 cm to about 50 cm and a thickness in a range of about 1 cm to about 10 cm. In some embodiments, the flaps 124 may be formed from one or more metals, such as a specially designed alloy steel or carbon steel. The dimensions and the material selections of the flaps 124 may vary, depending on the application for which the coupling device 100 is used.

In the activated configuration of the hybrid seal 116, the rubber sealing element 120 extends radially from the body 104 of the coupling device 100 to seal against the outer pipe 109, thereby pushing the flaps 124 against the outer pipe 109 to cause the flaps 124 to pivot inward to form the closed configuration of the metal sealing element 122. In the activated configuration of the hybrid seal 116 and the closed configuration of the metal sealing element 122, the flaps 124 together define a gap 126 that is filled by the rubber sealing element 120 in a radially stretched state. In some embodiments, the gap 126 may have an axial length in a range of about 0.5 cm to about 40 cm, which can vary depending on the application for which the coupling device 100 is used. In this manner, the hybrid seal 116 can provide both rubber-to-metal sealing with the outer pipe 109 along a portion of the rubber sealing element 120 that passes through the gap 126 and can provide metal-to-metal sealing with the outer pipe 109 along the flaps 124 of the metal sealing element 122. Such hybrid sealing functionality may allow a reduced overall size of the coupling device 100 in that, in some embodiments, a single hybrid seal 116 may replace both a metal seal 112 and a rubber seal 114. Such hybrid material makeup also makes the hybrid seals 116 suitable for use in both gas wells and oil wells. In some embodiments, the hybrid material makeup is also beneficial in that the metal flaps 124 may protect the rubber sealing elements 120 from damage while running the coupling device 100 in the hole.

The coupling device 100 further includes multiple hydraulic power units that can be operated to activate the seals 106. For example, referring to FIGS. 6 and 7, the coupling device 100 includes a hydraulic power unit (HPU) 128 that is dedicated to operation of the metal seals 112. While an illustration of the metal seals 112 is shown only one side of the body 104 of the coupling device 100, it should be understood that the metal seals 112 are circumferential elements that extend around the body 104 of the coupling device 100. The HPU 128 is located within the interior region 118 of the coupling device 100 and includes a fluid reservoir 130 that contains hydraulic fluid 132 (for example, synthetic fluid, petroleum-based fluid, or water-based fluid). The HPU 128 further includes multiple fluid channels 134 respectively aligned with the multiple metal seals 112, a fluid line 136 that connects the fluid channels 134 to the fluid reservoir 130, a pump 138 that can move hydraulic fluid 132 between the fluid reservoir 130 and the fluid channels 134, and a valve 140 (for example, a check-relief valve) that can adjust a flow rate at which hydraulic fluid 132 flows along the fluid line 136.

Figure 7:
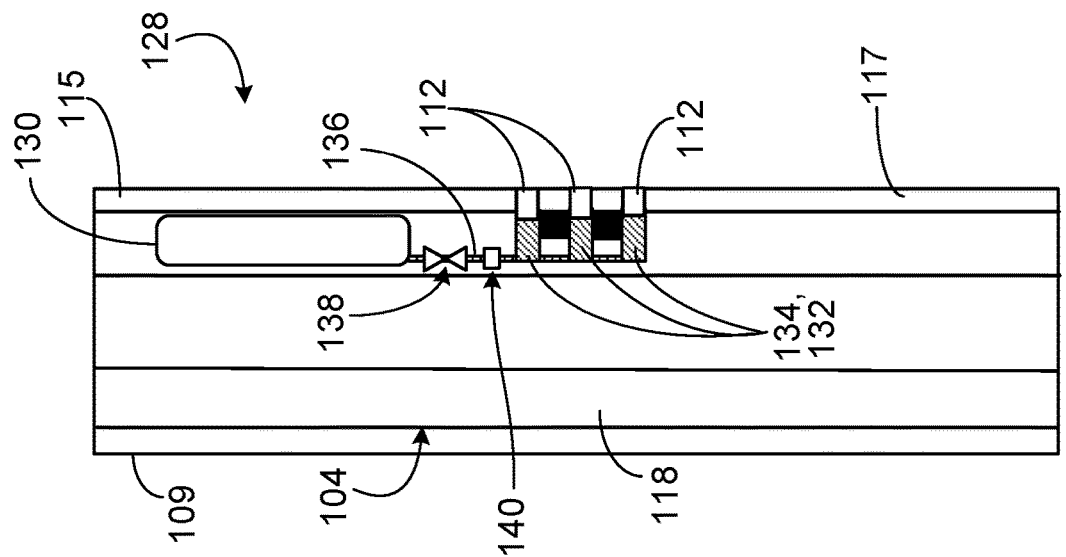
FIG. 7 is a side cross-sectional view of the HPU and the cooperating metal seals of FIG. 6 in an activated state.
Figure 6:
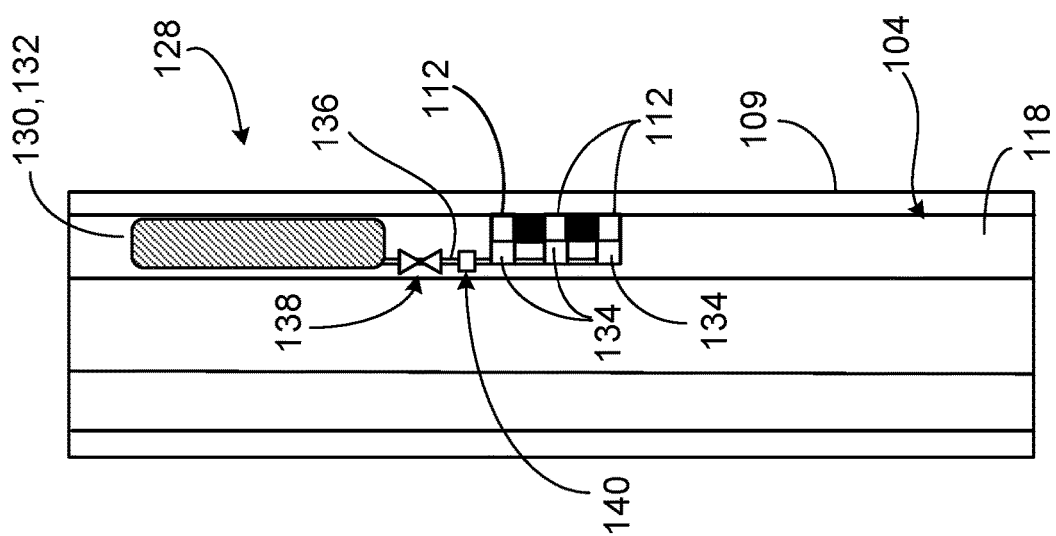
FIG. 6 is a side cross-sectional view of an HPU and cooperating metal seals of the coupling device of FIG. 1 in a deactivated state.

Based on one or more control signals (for example, activation commands or seal commands) transmitted to the pump 138, the pump 138 is operable to pump hydraulic fluid 132 from the fluid reservoir 130 to the fluid channels 134 such that the hydraulic fluid 132 forces the metal seals 112 radially outward to seal against the outer pipe 109, as shown in FIG. 7. In some embodiments, a process of activating the metal seals 112 may occur over a period of about 60 seconds (s) to about 90 s, may occur in even less time, or may occur over a longer period of time. Conversely, based on or more control signals (for example, deactivation commands or unseal commands) transmitted to the pump 138, the pump 138 is also operable to pump hydraulic fluid 132 from the fluid channels 134 to the fluid reservoir 130 to allow the metal seals 112 to retract radially inward from the outer pipe 109 and into the fluid channels 134, as shown in FIG. 6. A process of deactivating the metal seals 112 may occur over a period of about 60 s to about 90 s, may occur in even less time, or may occur over a longer period of time. The mechanical integrity of the metal seals 112 is typically maintained over an unlimited number of multiple cycles.

Referring to FIGS. 8 and 9, the coupling device 100 further includes an HPU 142 that is dedicated to operation of the rubber seals 114. While an illustration of the rubber seals 114 is shown only one side of the body 104 of the coupling device 100, it should be understood that the rubber seals 114 are circumferential elements that extend around the body 104 of the coupling device 100. The HPU 142 is also located within the interior region 118 of the coupling device 100 and includes a fluid reservoir 144 that contains hydraulic fluid 132. The HPU 142 further includes multiple fluid channels 146 respectively aligned with the multiple rubber seals 114, a fluid line 148 that connects the fluid channels 146 to the fluid reservoir 144, a pump 150 that can move hydraulic fluid 132 between the fluid reservoir 144 and the fluid channels 146, and a valve 152 (for example, a check-relief valve) that can adjust a flow rate at which hydraulic fluid 132 flows along the fluid line 148.

Based on one or more control signals (for example, activation commands or seal commands) transmitted to the pump 150, the pump 150 is operable to pump hydraulic fluid 132 from the fluid reservoir 144 to the fluid channels 146 such that the hydraulic fluid 132 forces the rubber seals 114 radially outward to seal against the outer pipe 109, as shown in FIG. 9. A process of activating the rubber seals 114 may occur over a period of about 60 s to about 90 s, may occur in even less time, or may occur over a longer period of time. Conversely, based on or more control signals (for example, deactivation commands or unseal commands) transmitted to the pump 150, the pump 150 is also operable to pump hydraulic fluid 132 from the fluid channels 146 to the fluid reservoir 144 to allow the rubber seals 114 to retract radially inward from the outer pipe 109 and into the fluid channels 146, as shown in FIG. 8. A process of deactivating the rubber seals 114 may occur over a period of about 60 s to about 90 s, may occur in even less time, or may occur over a longer period of time. The mechanical integrity of the rubber seals 114 is typically maintained over an unlimited number of multiple cycles.

Figure 11:
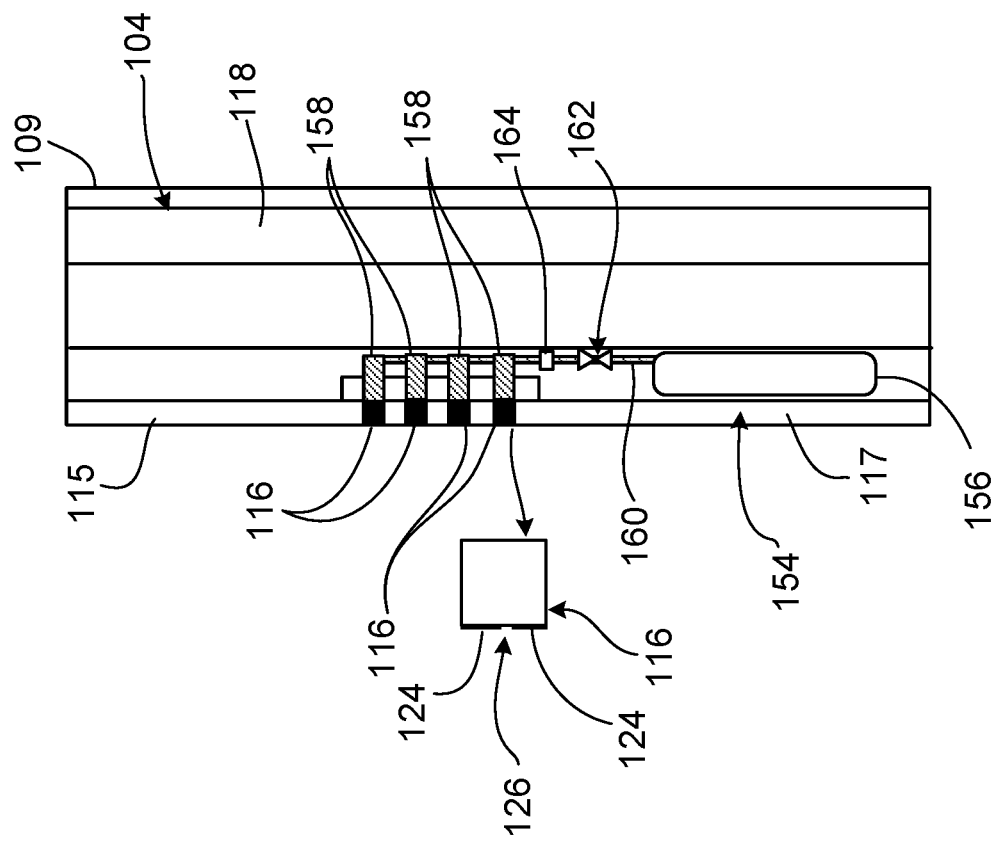
FIG. 11 is a side cross-sectional view of the HPU and the cooperating hybrid seals of FIG. 10 in an activated state.
Figure 10:
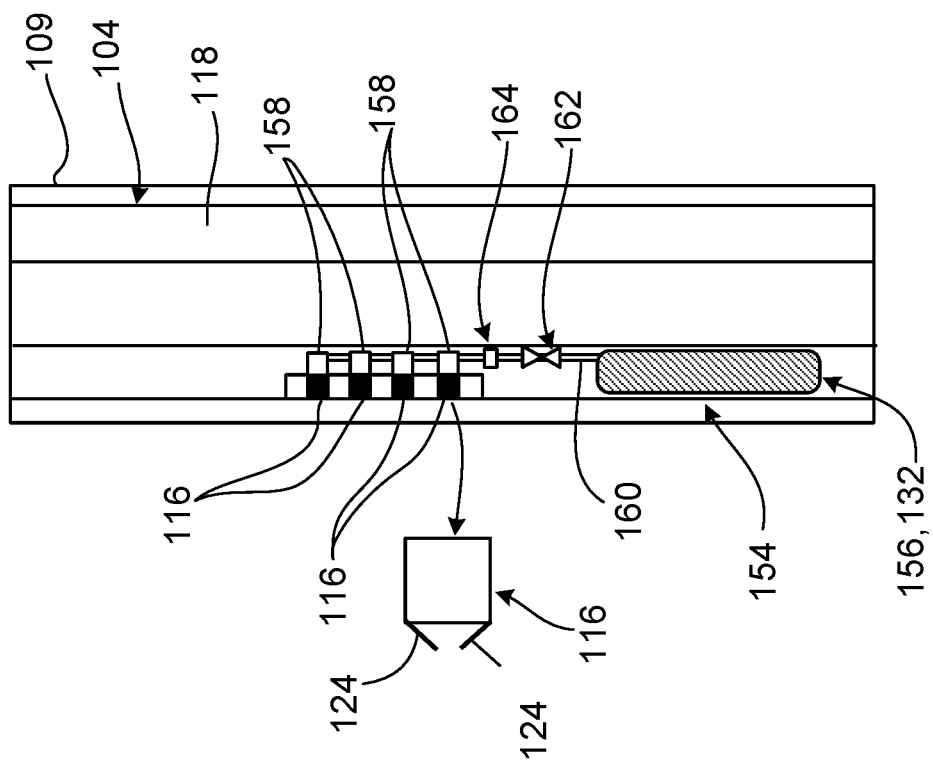
FIG. 10 is a side cross-sectional view of an HPU and cooperating hybrid seals of the coupling device of FIG. 1 in a deactivated state.

Referring to FIGS. 10 and 11, the coupling device 100 further includes an HPU 154 that is dedicated to operation of the hybrid seals 116. While an illustration of the hybrid seals 116 is shown only one side of the body 104 of the coupling device 100, it should be understood that the hybrid seals 116 are circumferential elements that extend around the body 104 of the coupling device 100. The HPU 154 is also located within the interior region 118 of the coupling device 100 and includes a fluid reservoir 156 that contains hydraulic fluid 132. The HPU 154 further includes multiple fluid channels 158 respectively aligned with the multiple hybrid seals 116, a fluid line 160 that connects the fluid channels 158 to the fluid reservoir 156, a pump 162 that can move hydraulic fluid 132 between the fluid reservoir 156 and the fluid channels 158, and a valve 164 (for example, a check-relief valve) that can adjust a flow rate at which hydraulic fluid 132 flows along the fluid line 160.

Based on one or more control signals (for example, activation commands or seal commands) transmitted to the pump 162, the pump 162 is operable to pump hydraulic fluid 132 from the fluid reservoir 156 to the fluid channels 158 such that the hydraulic fluid 132 forces the hybrid seals 116 radially outward to seal against the outer pipe 109, as shown in FIG. 11. In the activated state of the hybrid seals 116, the flaps 124 of the hybrid seals 116 are collapsed against the rubber sealing element 120, as shown in FIG. 5. A process of activating the hybrid seals 116 may occur over a period of about 60 s to about 90 s, may occur in even less time, or may occur over a longer period of time. Conversely, based one or more control signals (for example, deactivation commands or unseal commands) transmitted to the pump 162, the pump 162 is also operable to pump hydraulic fluid 132 from the fluid channels 158 to the fluid reservoir 156 to allow the hybrid seals 116 to retract radially inward from the outer pipe 109 and into the fluid channels 158, as shown in FIG. 10. In the deactivated state of the hybrid seals 116, the flaps 124 of the hybrid seals 116 extend away from the rubber sealing element 120, as shown in FIG. 4. A process of deactivating the hybrid seals 116 may occur over a period of about 60 s to about 90 s, may occur in even less time, or may occur over a longer period of time. The mechanical integrity of the hybrid seals 116 is typically maintained over an unlimited number of multiple cycles.

While the HPUs 128, 142, 154 are illustrated separately for clarity in FIGS. 6-11, the coupling device 100 includes all of the HPUs 128, 142, 154, such that all of the seals 106 may be activated simultaneously, or a combination of any subset of one or more of the metal seals 112, one or more of the rubber seals 114, and one or more of the hybrid seals 116 may be activated simultaneously. Accordingly, the metal seals 112, the rubber seals 114, and the hybrid seals 116 can together provide a triple sealing system that improves fluidic isolation of the annular regions 115, 117 as compared to conventional sealing systems that include a fewer type of sealing components or a fewer type of sealing materials. For example, such a triple sealing system can improve a capability of a wellbore to achieve a V0 gas tight seal certification, as compared to such conventional sealing systems.

FIGS. 12 and 13 respectively illustrate deactivated and activated states of one of the positioning elements 108 of the coupling device 100. The positioning element 108 is a circumferential component that has a wedge-shaped cross-sectional area. As shown, the coupling device 100 further includes an HPU 166 that is dedicated to operation of one of the positioning elements 108 (for example, the lower positioning element 108). The HPU 166 is also located within the interior region 118 of the coupling device 100. Each HPU 166 includes a fluid reservoir 168 that contains hydraulic fluid 132, a expansion member 170 that extends around a circumference of the body 104, a mandrel 172 positioned between the expansion member 170 and the positioning element 108 and that also extends around the circumference of the body 104, a fluid line 174 that connects the expansion member 170 to the fluid reservoir 168, a pump 176 that can move hydraulic fluid 132 between the fluid reservoir 168 and the expansion member 170, and a valve 182 (for example, a check valve) that can manage fluid flow along the fluid line 174.

Based on one or more control signals (for example, activation commands) transmitted to the pump 176, the pump 176 is operable to pump hydraulic fluid 132 from the fluid reservoir 168 to the expansion member 170 to cause that the expansion member 170 to expand. Expansion of the expansion member 170 causes the mandrel 172 to move in a first axial direction 180 (for example, a downhole direction) and to therefore slide along an inner wedge surface of the positioning element 108. As the mandrel 172 slides along the positioning element 108, the mandrel 172 exerts a radial force on the positioning element 108 to cause the positioning element 108 to slide in a second, reverse axial direction 178 (for example, an uphole direction). Such shifting of the positioning element 108 causes the positioning element 108 to extend radially from the body 104 and to the inner surface of the outer pipe 109.

In the axially shifted position, the positioning element 108 can be maintained against the outer pipe 109 owing to pressure maintained in the fluid line 174 by the valve 182 to support the coupling device 100 and the pipe segments 111, 113 attached thereto in a fixed position within the outer pipe 109 (for example, to set the coupling device 100 within the outer pipe 109). In the axially shifted position, the positioning element 108 can also center the coupling device 100 and the pipe segments 111, 113 attached thereto about the central axis 127 of the outer pipe 109, as shown in FIG. 13. A process of activating the positioning elements 108 may occur over a period of about 60 s to about 90 s, may occur in even less time, or may occur over a longer period of time. While only one positioning element 108 is illustrated in FIGS. 12 and 13, it should be understood that both positioning elements 108 of the coupling device 100 cooperate to achieve maximal securement to the outer pipe 109 and optimal centering within the outer pipe 109.

Conversely, based on one or more control signals (for example, deactivation commands) transmitted to the pump 176, the pump 176 is also operable to pump hydraulic fluid 132 from the expansion member 170 to the fluid reservoir 162 to allow the expansion member 170 to revert to an unexpanded state. Accordingly, the mandrel 172 can slide in the second axial direction 178 back to an initial position to allow the positioning element 108 to slide in the first axial direction 180 back to a deactivated position, as shown in FIG. 12. A process of deactivating the positioning element 108 may occur over a period of about 60 s to about 90 s, may occur in even less time, or may occur over a longer period of time. The mechanical integrity of the positioning elements 108 is typically maintained over an unlimited number of multiple cycles.

The pressure sensors 110 can be operated to measure pressures in the uphole and downhole annular regions 115, 117 when one or more of the seals 106 are activated. In some examples, such pressures may indicate satisfactory performance of the seals 106. In some examples, the pressures may indicate one or more failures in the seals 106 (for example, tears or cuts in the rubber material), gaps or openings between the seals 106 and the inner surface of the outer pipe 109, or leaks within other components the pipe assembly 101, itself (for example, uphole pipe segment 111, the downhole pipe segment 113, or the outer pipe 109).

Figure 14:
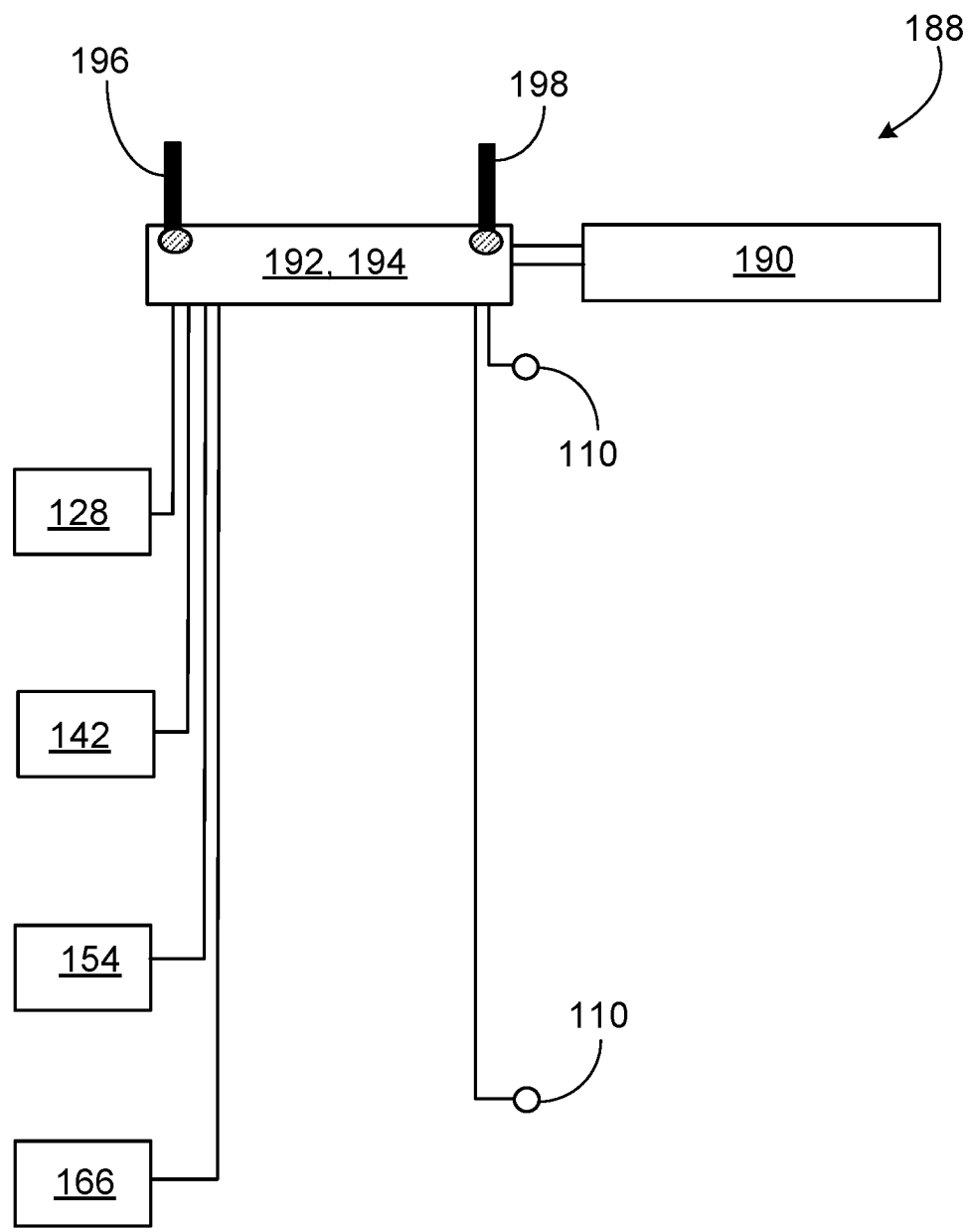
FIG. 14 is a schematic illustration of a control unit of the coupling device of FIG. 1.

The coupling device 100 also includes a control unit 188 that is responsible for transmission of data in real time between the coupling device 100 and various remote components located at the surface 123 of the wellbore 103, including the transmitter 119 and the receiver 121. For example, FIG. 14 illustrates a block diagram of the control unit 188 of the coupling device 100. In some embodiments, the control unit 188 is positioned within the interior region 118 near one end of the body 104. The control unit 188 includes a power source 190, one or more processors 192, a computer-readable medium 194, a transmitter 196, and a receiver 198.

The computer-readable medium 194 can store instructions that are executable by the one or more processors 192 to perform various operations at the coupling device 100. For example, the one or more processors 192 are programmed to process information transmitted to the receiver 198 of the control unit 188 from components located at the surface 123 and to process instructions stored on the computer-readable medium, as well as information acquired at the coupling device 100 (for example, via the pressure sensors 110). As a result of on-going communication via the transmitter 196, the one or more processors 192 are able to provide a diagnostic analysis of various functionalities (for example, failures in any of the seals 106 or the positioning elements 110) of the coupling device 100 in real time, as well as measurements obtained at the positioning elements 108 and the pressure sensors 110. The one or more processors 192 can communicate with components at the surface 123 via one or both of wireless signals and electromagnetic signals at the transmitter 196 and the receiver 198, while the one or more processors 192 can communicate with the components of the coupling device 100 (for example, the power source 190, the positioning elements 108, the pressure sensors 110, the seals 106, and the HPUs 128, 142, 154, 166) via wired connections, as shown in FIG. 14. In some embodiments, the one or more processors 192 can determine a differential or relative pressure between the two pressure sensors 110 or absolute pressures at the pressure sensors 110. In some embodiments, the pressure sensors 110 may communicate with the one or more processors 192 via a wireless connection instead of a wired connection, as shown in FIG. 14.

In some embodiments, the control unit 188 can receive instructions (for example, activation commands or seal commands) at the receiver 198 to perform sealing operations within the wellbore 103 and transmit such sealing instructions to one or more of the HPUs 128, 142, 154 for mechanical activation or deactivation of one or more of the seals 106. The control unit 188 may also receive related instructions, such as instructions to change states (for example, an "on" command or an "off" command) of one or more of the hydraulic pumps 138, 150, 162 or instructions for setting a target pressure of one or more of the hydraulic pumps 138, 150, 162. In some embodiments, the control unit 188 can also receive status information at the receiver 198 from one or more of the seals 106 and the HPUs 128, 142, 154, 166. In some embodiments, the transmitter 196 can transmit such status information to the surface 123. Example status information may include a state of one or more seals 106 (such as "activated" or "deactivated") or a hydraulic pressure at any of the HPUs 128, 142, 154, 166. In each case, the control unit 188 is programmed to transmit and receive information automatically and in real time such that any detected gas migration can be monitored in real time to improve safety at a wellbore. For example, a pipe segment (for example, casing) run in a wellbore may explode if a pressure threshold of the pipe segment is exceeded. Therefore, pipe segments are selected to account for pressures of the rock formation at certain depths. However, if gas migrates upward to a pipe segment that is not equipped to handle excessive pressure caused by the gas migration, then there may be risks associated with one or more of explosion, collapse, material losses, and environment losses.

In some embodiments, one or more of the HPUs 128, 142, 154 may be interconnected to allow fluidic communication between the HPUs 128, 142, 154. Such interconnection can allow one HPU 128, 142, 154 to control multiple seals 106 on other of the HPUs 128, 142, 154 in the event of an HPU failure. In some embodiments, one or more of the HPUs 128, 142, 154 can include its own one or more sensors (for example, a pressure sensor or another type of sensor). In such embodiments, each HPU can receive measurements or other information sensed by its own one or more sensors and transmit such data to the control unit 188.

The power source 190 (for example, a lithium battery) can provide operational power to the one or more processors 192 and to the HPUs 128, 142, 154, 166. The power source 190 can be replaced at the end of a life of the power source 190 in an operation carried out at the surface 123. In some embodiments, the power source 190 is recyclable.

In operation of the coupling device 100, the control unit 188 can receive one or more commands from the surface 123 or from another component of the drill string at the receiver 198. The one or more processors 192 can analyze the one or more commands to determine which of the HPUs 128, 142, 154, 166 to activate. The HPUs 128, 142, 154, 166 can be operated independently of one another, such that the metal seals 112, rubber seals 114, hybrid seals 116, and positioning elements 108 can be operated independently of one another. The one or more processors 192 can send the one or more commands to the appropriate HPUs 128, 142, 154, 166, which will activate the respective pumps 138, 150, 162, 176 to operate any of the seals 112, 114, 116 and position elements 108 that are identified in the one or more commands. The respective HPUs 128, 142, 154, 166 can send confirmation signals to the one or more processors 192 regarding a status of each HPUs 128, 142, 154, 166, seals 112, 114, 116, and positioning elements 108. For example, the confirmation signals may indicate whether any of such components are functioning properly or improperly with respect to the one or more commands, including whether the components are in activated state or a deactivated state. For example, an activated state of the positioning elements 108 may indicate that the coupling device 100 is appropriately set in the pipe assembly 101, which may be especially important when installed in a curved section of a wellbore. In other examples, a deactivated state of the positioning element 108 may indicate that the coupling device 100 is detached from the pipe assembly 101 for release. Via the transmitter 196, the one or more processors 192 can send the confirmation signals and real-time status information to one or both of the components at the surface 123 or other components of the drill string. Such full diagnostic reporting in real time can significantly improve the efficiency and reduce the costs of operations carried out at a wellbore.

Figure 15:
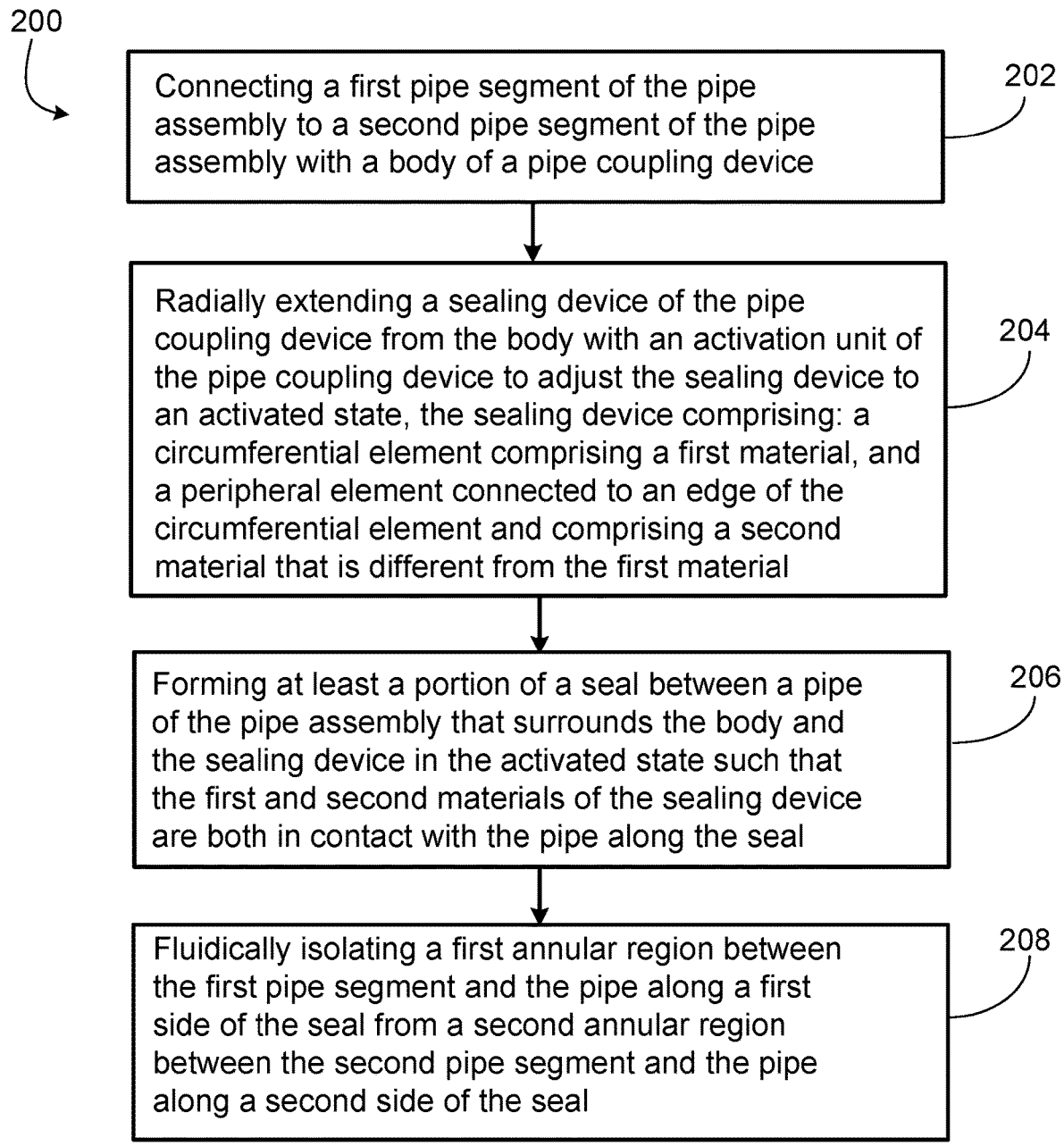
FIG. 15 is a flow chart illustrating an example method of sealing the pipe assembly of FIG. 1.

FIG. 15 is a flow chart illustrating an example method 200 of sealing a pipe assembly (for example, the pipe assembly 101). In some embodiments, the method 200 includes connecting a first pipe segment (for example, the uphole pipe segment 111) of the pipe assembly to a second pipe segment (for example, the downhole pipe segment 113) of the pipe assembly with a body (for example, the body 104) of a pipe coupling device (for example, the coupling device 100) (202). In some embodiments, the method 200 further includes radially extending a sealing device (for example, the hybrid seal 116) of the pipe coupling device from the body with an activation unit (for example, the HPU 154) of the pipe coupling device to adjust the sealing device to an activated state, the sealing device including a circumferential element (for example, the rubber sealing element 120) including a first material and a peripheral element (for example, the metal sealing element 122) connected to an edge of the circumferential element and including a second material that is different from the first material (204). In some embodiments, the method 200 further includes forming at least a portion of a seal between a pipe (for example, the outer pipe 109) of the pipe assembly that surrounds the body and the sealing device in the activated state such that the first and second materials of the sealing device are both in contact with the pipe along the seal (206). In some embodiments, the method 200 further includes fluidically isolating a first annular region (for example, the uphold annular region 115) between the first pipe segment and the pipe along a first side of the seal from a second annular region (for example, the downhole annular region 117) between the second pipe segment and the pipe along a second side of the seal (208).

While the coupling device 100 has been described and illustrated with respect to certain dimensions, sizes, shapes, arrangements, materials, and methods 200, in some embodiments, a coupling device that is otherwise substantially similar in construction and function to the coupling device 100 may include one or more different dimensions, sizes, shapes, arrangements, and materials or may be utilized according to different methods.

For example, while the rubber seals 114 and the hybrid seals 116 have been described and illustrated as being arranged in an alternating pattern with the metal seals 112, in some embodiments, a coupling device that is otherwise substantially similar in construction and function to the coupling device 100 may include metal seals 112, rubber seals 114, and hybrid seals 116 that arranged in a different pattern.

While the pipe assembly 101 has been described and illustrated as including one coupling device 100, in some embodiments, a pipe assembly installed at a wellbore may include multiple coupling devices 100 arranged at different locations within the pipe assembly that create multiple annular regions between the multiple coupling devices 100. Such an arrangement may help operators to identify specific locations along the pipe assembly at which any gas migration occurs.

Other embodiments are also within the scope of the following claims.

What is claimed is:

1. A pipe coupling device, comprising:
    a body configured to connect a first pipe segment to a second pipe segment;
    a sealing device carried by the body and comprising:
        a circumferential element comprising a first material, and
        a peripheral element connected to an edge of the circumferential element and comprising a second material that is different from the first material,
        wherein the peripheral element comprises a first flap and a second flap that are pivotable with respect to the circumferential element, and
        wherein the peripheral element is adjustable between:
            an open configuration in which the first and second flaps extend radially outward from the circumferential element at an acute angle with respect to a central axis of the pipe coupling device, and
            a closed configuration in which the first and second flaps lie against the circumferential element substantially parallel to the central axis and define a gap therebetween; and
    an activation unit configured to:
        adjust the sealing device to an activated state in which the peripheral element of the sealing device is in the closed configuration and in which the sealing device extends radially from the body to form at least a portion of a seal with a pipe that surrounds the body, such that:
            the seal fluidically isolates a first annular region between the first pipe segment and the pipe along a first side of the seal from a second annular region between the second pipe segment and the pipe along a second side of the seal, and
            the first and second materials of the sealing device are both in contact with the pipe along the seal; and
        adjust the sealing device to a deactivated state in which the peripheral element of the sealing device is in the open configuration and in which the sealing device is retracted substantially within the body to form an opening between the pipe coupling device and the pipe that allows fluid communication between the first and second annular regions.

2. The pipe coupling device of claim 1, wherein the circumferential element is configured to extend into the gap when the sealing device is in the activated state.

3. The pipe coupling device of claim 1, wherein the sealing device is a first sealing device, the pipe coupling device further comprising:
    a second sealing device carried by the body and comprising the first material.

4. The pipe coupling device of claim 1, further comprising:
    a third sealing device carried by the body and comprising the second material.

5. The pipe coupling device of claim 1, further comprising one or more additional sealing devices.

6. The pipe coupling device of claim 1, wherein the activation unit comprises a hydraulic system configured to adjust the sealing device to the activated state.

7. The pipe coupling device of claim 1, further comprising one or more positioning elements carried by the body and configured to center the pipe coupling device about a central axis of the pipe.

8. The pipe coupling device of claim 7, further comprising:
    a first pressure sensor arranged along the body to measure a first pressure in the first annular region; and
    a second pressure sensor arranged along the body to measure a second pressure in the second annular region.

9. The pipe coupling device of claim 8, further comprising a control unit in electrical communication with remote electronic components and with the activation unit, the one or more positioning elements, and the first and second pressure sensors.

10. The pipe coupling device of claim 9, wherein the control unit is configured to receive status information in real time from one or more of the activation unit, the one or more positioning elements, and the first and second pressure sensors.

11. The pipe coupling device of claim 10, wherein the control unit is configured to transmit the status information in real time to one or more of the remote electronic components.

12. The pipe coupling device of claim 10, wherein the control unit is configured to identify a failure associated with the sealing device based on the status information.

13. The pipe coupling device of claim 9, wherein the control unit is configured to receive a sealing command from one or more of the remote electronic components.

14. The pipe coupling device of claim 13, wherein the control unit is configured to send the sealing command to the activation unit for activation of the sealing device.

15. The pipe coupling device of claim 1, wherein the first material comprises rubber.

16. The pipe coupling device of claim 15, wherein the second material comprises metal.

17. A method of sealing a pipe assembly, the method comprising:
    connecting a first pipe segment of the pipe assembly to a second pipe segment of the pipe assembly with a body of a pipe coupling device;

radially extending a sealing device of the pipe coupling device from the body with an activation unit of the pipe coupling device to adjust the sealing device to an activated state, the sealing device comprising:
- a circumferential element comprising a first material, and
- a peripheral element connected to an edge of the circumferential element and comprising a second material that is different from the first material,
- wherein the peripheral element comprises a first flap and a second flap that are pivotable with respect to the circumferential element, and
- wherein the peripheral element is adjustable between:
  - an open configuration in which the first and second flaps extend radially outward from the circumferential element at an acute angle with respect to a central axis of the pipe coupling device, and
  - a closed configuration in which the first and second flaps lie against the circumferential element substantially parallel to the central axis and define a gap therebetween;

forming at least a portion of a seal between a pipe of the pipe assembly that surrounds the body and the sealing device in the activated state such that the first and second materials of the sealing device are both in contact with the pipe along the seal, wherein the peripheral element of the sealing device is in the closed configuration in the activated state;

fluidically isolating a first annular region between the first pipe segment and the pipe along a first side of the seal from a second annular region between the second pipe segment and the pipe along a second side of the seal, wherein the sealing device is adjustable from the activated state to a deactivated state in which the peripheral element of the sealing device is in the open configuration and in which the sealing device is retracted substantially within the body to form an opening between the pipe coupling device and the pipe that allows fluid communication between the first and second annular regions.

18. The method of claim 17, further comprising urging the circumferential element into the gap when the sealing device is in the activated state.

19. The method of claim 17, wherein the sealing device is a first sealing device, and wherein the pipe coupling device further comprises a second sealing device comprising the first material.

20. The method of claim 19, wherein the pipe coupling device further comprises a third sealing device comprising the second material.

21. The method of claim 17, further comprising receiving status information at a control unit of the pipe coupling device from one or more of:
- the activation unit;
- a first pressure sensor of the pipe coupling device arranged along the body to measure a first pressure in the first annular region;
- a second pressure sensor of the pipe coupling device arranged along the body to measure a second pressure in the second annular region; and
- one or more positioning elements of the pipe coupling device carried by the body and configured to center the pipe coupling device about a central axis of the pipe.

22. The method of claim 21, further comprising transmitting the status information in real time from the control unit to one or more remote electronic components.

23. The method of claim 21, further comprising identifying a failure associated with the sealing device based on the status information at the control unit.

* * * * *